United States Patent [19]

Cane et al.

[11] 4,332,642
[45] Jun. 1, 1982

[54] PAIRED STAGE FLASH EVAPORATOR HAVING IMPROVED DISTILLATE COLLECTION

[75] Inventors: Domenick Cane, Springfield; Ray D. Peterson, Upper Providence Township, Delaware County, both of Pa.

[73] Assignee: Westinghouse Electric Corp., Pittsburgh, Pa.

[21] Appl. No.: 286,091

[22] PCT Filed: Jun. 19, 1981

[86] PCT No.: PCT/US81/00852
§ 371 Date: Jun. 19, 1981
§ 102(e) Date: Jun. 19, 1981

[51] Int. Cl.³ .................. B01D 3/06; C02F 1/06
[52] U.S. Cl. ................. 202/173; 202/180; 202/182; 202/197; 202/202; 159/2 MS; 203/11; 203/88
[58] Field of Search ............ 202/173, 172, 174, 177, 202/180, 182, 197, 202, 201, 205, 155; 203/10, 11, 22, 73, 88, 91; 208/349, 352, 361, 365; 159/2 MS; 122/441, 442

[56] References Cited

U.S. PATENT DOCUMENTS

| | | | |
|---|---|---|---|
| 3,197,387 | 7/1965 | Lawrence | 202/173 |
| 3,228,859 | 1/1966 | Frankel et al. | 202/173 |
| 3,488,260 | 1/1970 | Gilbert | 202/173 |
| 3,707,442 | 12/1972 | Takahashi et al. | 202/173 |
| 3,713,989 | 1/1973 | Bom | 202/173 |
| 3,933,597 | 1/1976 | Barba et al. | 202/173 |

FOREIGN PATENT DOCUMENTS

| | | | |
|---|---|---|---|
| 12256 | 6/1980 | European Pat. Off. | 202/173 |
| 14672 | 8/1980 | European Pat. Off. | 202/173 |
| 54-116381 | 9/1979 | Japan | 202/173 |

Primary Examiner—Wilbur L. Bascomb, Jr.
Attorney, Agent, or Firm—E. F. Possessky

[57] ABSTRACT

A paired stage flash evaporator unit is provided with an elongated shell having respective higher temperature and lower temperature evaporation chambers extending along a bottom portion of the shell space and separated from each other by an interstage elongated partition wall. A condenser tube bundle extends longitudinally between opposite shell end walls in an upper portion of the shell space. A transverse interstage partition separates the tube bundle into separate condenser chambers. Each condenser chamber is paired with an evaporation chamber by means of shroud and other isolation structure thereby forming two paired stages in the unit.

In each stage, a liquid separator mesh extends coextensively with the evaporation chamber and both condenser chambers to direct vapor from the evaporation chamber into a flow path above the mesh. A distillate collection tray is supported beneath the tube bundle and it is divided into stage-separated tray portions by the transverse interstage partition.

A collection duct extends through a plant train of such evaporator units beneath the interstage partitions and tray portions in such evaporator units. The duct is internally partitioned to receive distillate from each stage and cascade the accumulated distillate to the next stage.

5 Claims, 6 Drawing Figures

PAIRED STAGE FLASH EVAPORATOR HAVING IMPROVED DISTILLATE COLLECTION

CROSS REFERENCE TO RELATED APPLICATIONS

Reference is made to Ser. No. 165,885, entitled "Multi-Stage Flash Evaporator Design" and filed on July 3, 1980 as a continuation of an application filed earlier on Dec. 8, 1978 by R. E. Bailie and assigned to the present assignee.

BACKGROUND OF THE INVENTION

The present invention relates to water desalting plants and more particularly to paired stage flash evaporators used in such plants.

In multistage flash evaporator water desalting plants, brine flows through successive evaporation stages at succesively lower pressures. In each evaporation stage, water flashes to vapor which rises to an associated condenser stage where water condenses on condenser tubes and falls to a collection tray. The term "unit" as used herein is meant to refer to that portion of each multistage evaporator vessel which is associated with a single tube bundle.

In the common long flow design for multistage flash evaporator units, the brine flows from evaporation stage to evaporation stage parallel to the direction of condenser tubes which extend between the ends of the evaporator unit. A plurality of stages, for example six to eight, may be included in each unit with a common partition separating the evaporation chamber and condenser chamber of each stage from the evaporation chamber and condenser chamber of the next stage. A pair of end tube plates and a pair of water boxes are needed for each long flow unit.

While the long flow design provides economy in the total number of end tube plates and water boxes needed for a plant, it has maintenance cost disadvantages particularly those resulting from the use of lengthy condenser tubes which may span 6 to 8 stages in a single unit. The long flow design characteristics usually make it most economical from manufacturing and operating standpoints for smaller capacity plants (say up to 3 million gallons per day) and for the very high capacity plants (say 10 million gallons per day and above).

The cross-flow design is another common design for multistage flash evaporator units. In the cross-flow arrangement, each stage is provided with a pair of water boxes and a pair of end tube plates. The condenser tubes extend between the end tube plates and are associated with a single evaporation chamber in which brine flows in the direction transverse to the condenser tubes. In this arrangement, there is no internal partitioning between successive stages in each evaporator unit because each unit typically contains a single stage. Partitioning between stages is thus provided by the separation of stages between successive units.

While the cross-flow design facilitates plant operation and provides some operating economy with the use of relatively short condenser tubes in each unit, more units are required. Since each unit requires two end tube plates and two water boxes, manufacturing costs are significantly increased. The prior art cross-flow design is usually more economical in higher capacity plants (say 2½ to 6 million gallons per day).

A more recent improved type of evaporator unit is referred to as a paired stage cross flow unit and it is disclosed in the cross-referenced patent application. In the paired stage cross-flow unit, a pair of evaporation stages and a pair of condenser stages are included in a single cross-flow unit with separation between the two evaporation chambers in the two successive evaporation stages provided by one partition which extends parallel to the tube axis and separation between the two condenser chambers provided by another partition which extends perpendicular to the tube axis direction. Flow communication is provided between the commonly staged evaporation and condenser chambers to provide for vapor flow for condensation and distillate collection. Likeness to the long flow design exists because the condenser tubes pass through two condenser chambers within a single evaporator unit. Cross-flow likeness exists because the brine flows transversely rather than longitudinally of the condenser tubes.

Because of the improved structure of the paired stage evaporator, two stages of flashing and condensing are provided in a single installed evaporator unit, where only one was possible in previous cross-flow designs. As a result, paired stage evaporator vessels provide generally improved operating efficiency, are shorter and lighter, and can be the same width as, or slightly wider than, evaporator vessels of conventional cross-flow design, for a given number of stages.

The paired stage evaporator plant, which comprises a group of adjacent evaporator units having their tube bundles connected by crossover piping, is typically smaller in plan area by 20 to 25 percent. A desalination plant of high capacity and conventional design might include 24 evaporator units connected in series with crossover piping to form an evaporator with 24 stages. In the paired stage configuration, only 12 evaporator units are needed to provide 24 stages of evaporation; the twelve paired-stage units are capable of producing the same quantity of distillate as 24 conventional cross-flow units.

As a result of the paired stage configuration, reduced tube plate and water box requirements lead to higher plant availability and lower maintenance cost and lower pumping energy costs. Single train plants can be constructed with lower initial cost and with greater total brine processing capacity.

In a conventional crossflow multistage flash evaporator, the vapors that are flashed off in each stage are passed through mesh separators and then condensed on tubes in the same stage. The distillate formed is cascaded from stage to stage in an accumulation duct and leaves the system at the lowest temperature stage.

The typical prior arrangement handles the stage-to-stage distillate cascade by using a collection duct located at one of the evaporator vessel end walls (i.e., at one end of the condenser tube bundle). In applying this arrangement to the paired-stage crossflow evaporator, two collection ducts are required for the two stages (one duct located at each end of the condenser tube bundle). The prior collection duct arrangement in the paired stage evaporator has the following disadvantages:

1. Reduced cycle thermal efficiency, since cascaded distillate is flashed off in the second stage downstream from the stage in which it is collected, thereby reducing the heat recovered in recycle condensers.

2. Increased evaporator shell cost due to the use of two collection ducts.

SUMMARY OF THE INVENTION

Each paired stage flash evaporator unit in a train of such units includes an elongated shell having a pair of elongated evaporation chambers extending along a bottom portion thereof and separated by a longitudinal interstage partition. The shell further includes a pair of condenser chambers located in an upper portion thereof and separated from each other by a transverse interstage partition.

Means including a liquid separator means are provided for directing vapor from one evaporation chamber to one of the condenser chambers in one stage and from the other evaporation chamber to the other condenser chamber in the other stage.

Distillate from the condenser tubes is collected by respective tray means under the tube bundle in the respective condenser chambers. Collection duct means is economically extended across the train of evaporator units in proximity to the transverse interstage partitions and beneath the tray means where it is easily accessed for maintenance from a manway at either end of the unit and where it allows clear access to the evaporation chambers. The collection duct means is structured to accumulate and cascade distillate from stage to stage thereby enabling efficient distillate flashoff in the next stage following the stage in which it is collected.

DESCRIPTION OF THE PREFERRED EMBODIMENT

Figure 1:
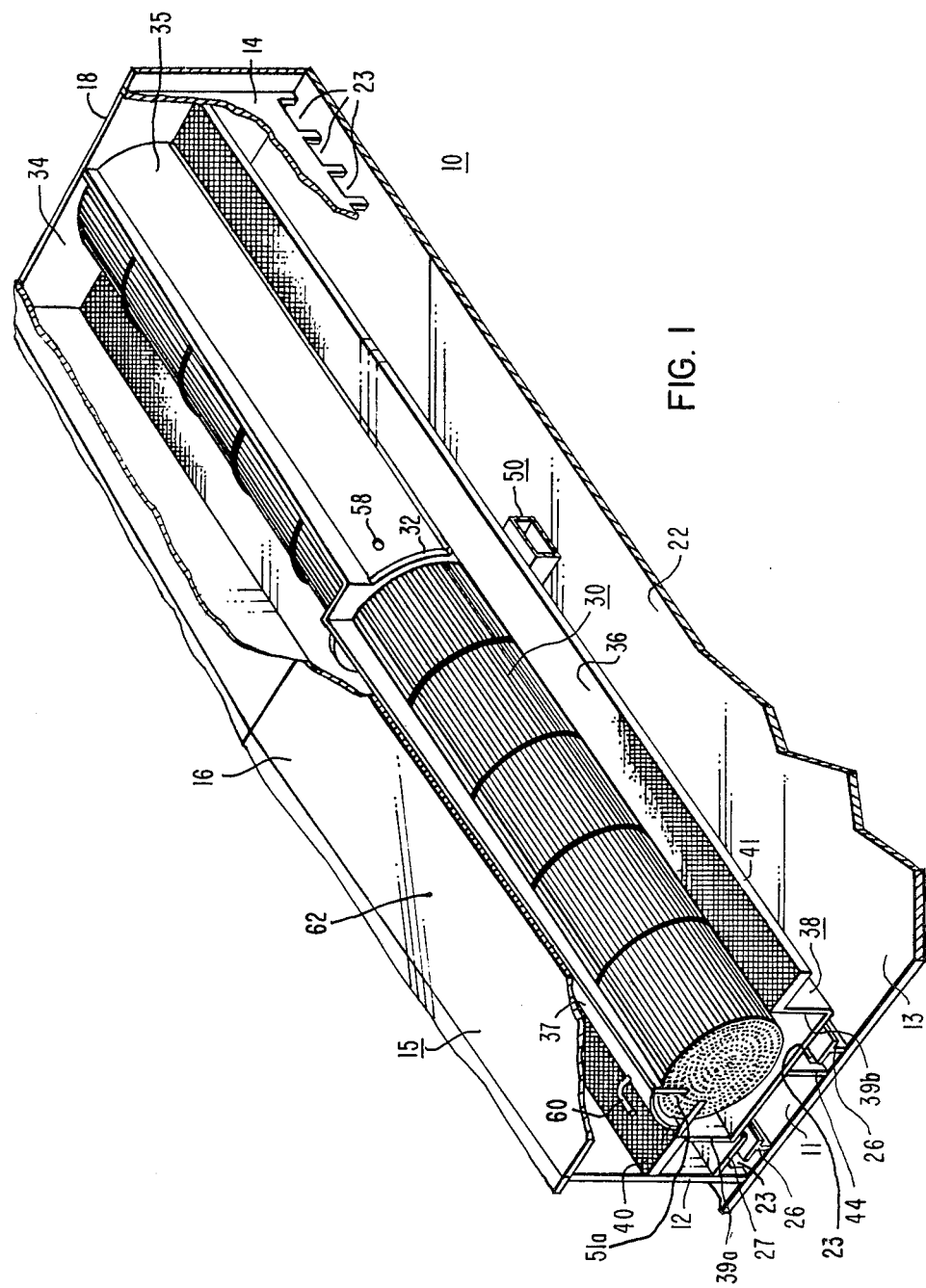
FIG. 1 shows a perspective view of an elongated flash evaporator unit which includes a centrally located collection duct and is otherwise arranged in accordance with the principles of the invention.
Figure 2:
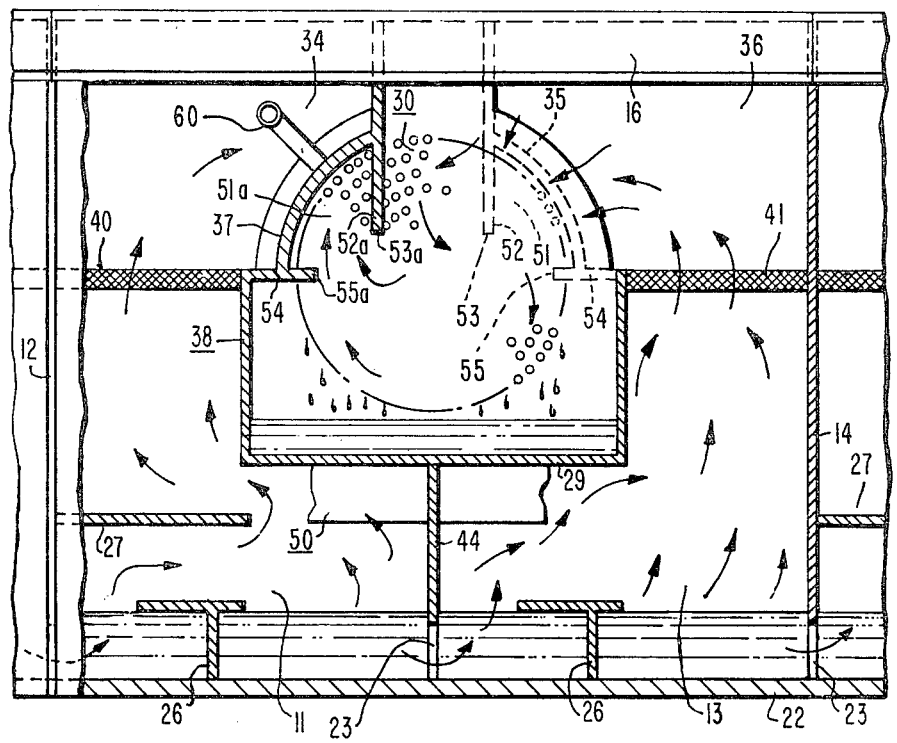
FIG. 2 shows a cross-section of the unit to illustrate the manner in which vapor flows from a flash chamber to the associated condenser chamber in the lower temperature stage of the two stages in the unit.
Figure 3:
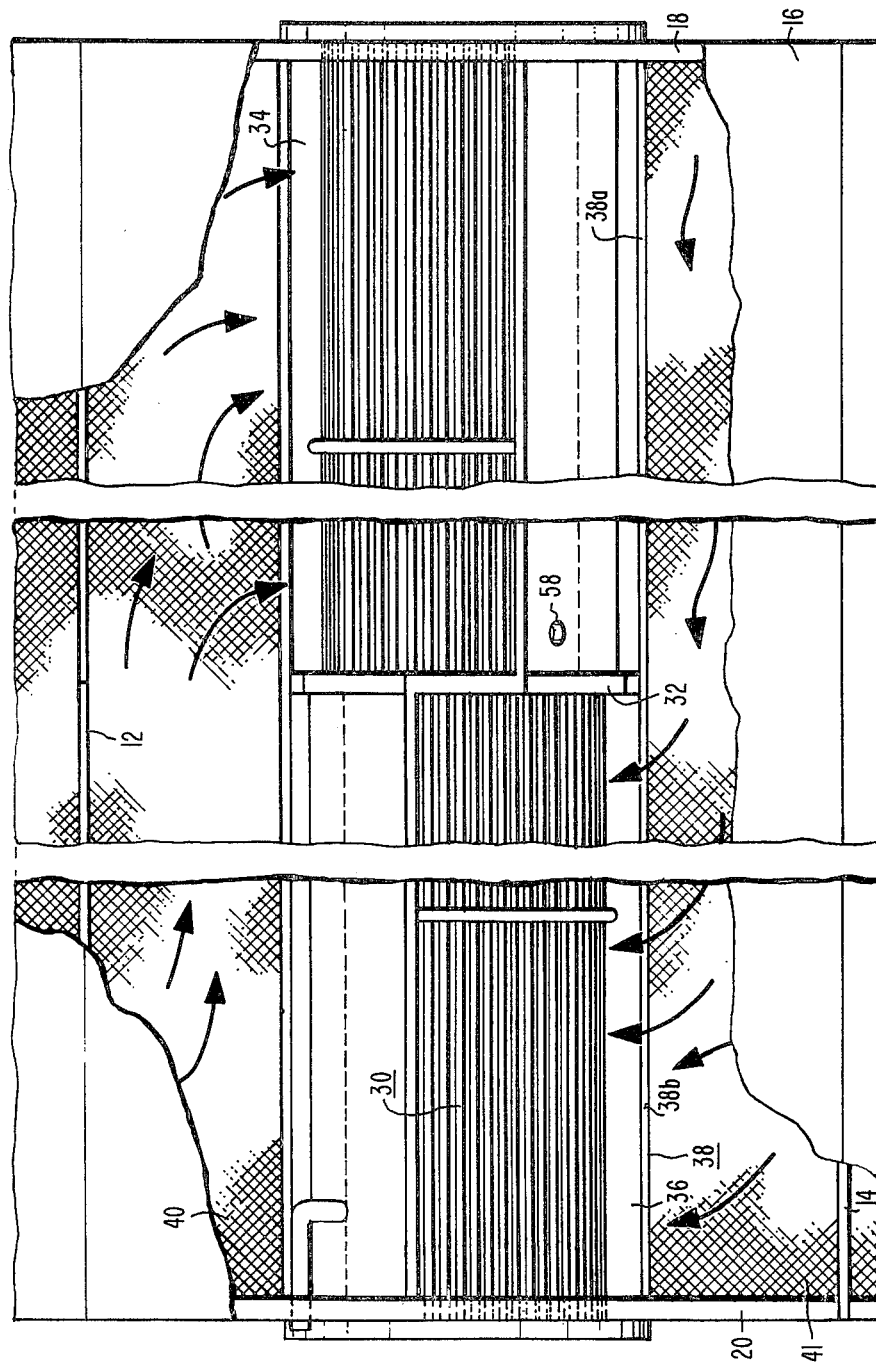
FIG. 3 shows a plan view which is partially broken away to show the condenser tube bundle and the manner in which vapor flows through and over a liquid separator mesh to enter the condenser chamber in each stage.

More particularly, there is shown in FIGS. 1-6, a paired-stage evaporator unit 10 of a multi-stage flash evaporator plant in which a solution such as sea water is to be processed. A plurality or train of interconnected paired stage units 10 are used to obtain the desired plant desalination efficiency.

Each paired stage unit 10 is provided with an elongated shell 15 which defines individual flash evaporation chambers 11 and 13 extending along the full length of the shell 15 in a bottom portion thereof. The upstream evaporation chamber 11 operates at a higher temperature and pressure, whereas the other downstream chamber 13 operates at a lower temperature and pressure. The shell 15 includes an upstream side wall 12, a longitudinal interstage evaporation stage partition 44, and a downstream side wall 14 each extending the full length of the shell 15 and the evaporation chambers 11 and 13. The longitudinal partition 44 generally longitudinally divides the bottom portion of the shell 15 into the two elongated evaporation chambers 11 and 13.

A roof or top member 16, flat or peaked and sloped as needed, covers the space between the longitudinal walls 12 and 14 and end walls or plates 18 and 20 which enclose the ends of the shell 15. A flat bottom member 22 (which continues as the bottom member for the next adjacent modular evaporator unit) completes the structure to define a generally rectangular enclosure having a roof top which is flat or peaked at its midpoint and sloped along the longitudinal dimension.

If desired, the evaporator unit 10 can be manufactured as a module without the downstream wall 14. The modules can be field assembled together at the plant site to provide successive evaporator units with only a single wall (i.e. the upstream wall 12) as opposed to a double wall between successive units.

The longitudinal walls 12, 44 and 14 terminate a distance above the bottom 22 to define a series of brine flow openings 23 which also extend the full length of the shell 15. A dam member 26 projects upwardly from the bottom 22 just downstream of the brine flow openings 23 to cause the brine to cascade thereover for increased exposure and vaporization of the brine in the associated evaporation chamber 11 or 13.

A horizontal splash baffle 27 projects forwardly into the higher temperature evaporation chamber 11 from the wall 12 just above the dam member 26 and extends slightly over the dam member 26 to reduce brine droplets from being entrained in upward vapor flow.

A single condenser tube bundle 30, generally circular in cross-section in this embodiment, extends along the full length of the shell 15 in the upper space beneath the roof member 16. A transverse interstage partition or dividing wall 32 is disposed preferably midway between the two opposed shell end plates 18 and 20 to aid in transversely dividing the upper portion of the housing 15 into two separate condenser chambers 34, 36. Each tube in the bundle 30 passes through an opening in the dividing wall 32 in sealed engagement therewith.

The condenser chamber 34 receives the vaporized solvent or vapor from the upstream evaporation chamber 11, and it is therefore partitioned from the downstream evaporation chamber 13 by a shroud member 35 which extends along the tube bundle between the condenser interstage partition 32 and the associated end plate 18 and generally covers one side of the tube bundle between the roof 16 and a distillate collection tray 38 which encloses the bottom of the condenser chamber 34. Similarly, a shroud 37 partitions the condenser chamber 36 from the upstream evaporation chamber 11.

In summary, the condenser chambers 34 and 36 are sealed and divided by the transverse partition 32 and the tray 38 and shrouds 35 and 37 into two separate condenser stages. Each condenser chamber has a vapor flow entry from the associated evaporation chamber therebelow.

A horizontally disposed and elongated mesh separator 40 preferably extends over the entire length of the evaporation chamber 11 and is supported thereover by suitable bracket (not shown) or other means on the upstream wall 12 and the tray leg 39a. The mesh separator 40 permits vapor to flow therethrough from the evaporation chamber 11 to the condenser chamber 34 substantially free of any entrained brine droplets. A similar mesh separator 41 is supported by the wall 14 and the tray leg 39b over the full length of the evaporation chamber 13 to direct vapor therefrom to the condenser chamber 36. Greater detail is provided on the structure and operation of the mesh separator 40, 41 in a copending application entitled "Paired Stage Flash Evaporator Having Improved Configuration", filed by D. Moen and R. Peterson concurrently herewith and assigned to the same assignee. In that same application, alternative tube bundle arrangements and alternative structure for removing non-condensables are also shown and described.

Opposite ends of the condenser tubes are received in tubesheets which are secured to the external face of the opposed end plates 18 and 20 and have attached thereto a hot water box (not shown) adjacent the end plate wall 18 and a cold water box (not shown) adjacent the end plate 20 to supply coolant to the condenser tubes in a manner well known in the art.

The distillate collection tray 38 is elongated and generally U-shaped to collect distillate from the condenser tubes. The tray 38 is disposed beneath the condenser tube bundle 30 and has separate portions 38a and 38b extending generally from the end shell plates 18 and 20 respectively to the dividing wall 32. The tray portions 38a and 38b are stage separated from each other by a bottom portion of the dividing wall 32. Upwardly projecting side legs 39a and 39b, of the tray 38 respectively are transversely spaced from the elongated shell side walls 12 and 14. In the evaporation chamber 13, the bottom 29 of the collection tray 38 functions to some extent as a splash baffle like the baffle 27 does in the chamber 11.

In summary of the general operation of the evaporator unit, brine enters the first upstream or higher temperature (HT) flash evaporator stage through a series of flow openings 23 which extend over the entire length of the shell (i.e. perpendicular to the direction of brine flow). The vapor which is flashed-off within the HT chamber flows through the upwardly located mesh 40 where entrained brine droplets are removed before the vapor enters the condenser chamber 34. Vapor is condensed on the heat transfer surface of the condenser tubes to form distillate which is collected in the distillate tray 38. Non-condensable gases are vented to the next evaporation stage through the vent opening 58.

The described operating process is essentially duplicated in the second lower temperature (LT) stage with the vapor flowing through the mesh separator 41 associated with the LT stage and enters the chamber 36 in which the other portion of the two stage condenser tube bundle is located. Any non-condensable vapors in the condenser chamber 36 are vented into the enveloped tube bundle portion and that portion of the vapor not condensed therein is ultimately externally vented through the conduit 60.

Figure 4:
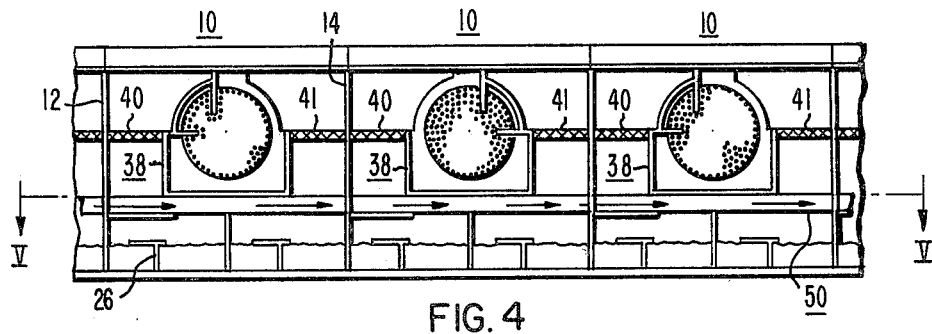
FIG. 4 shows a diagram, partially schematic, of the collection duct extending across a number of evaporator units in a plant train of such units.

Distillate is accumulated in a common collection duct 50 which preferably extends across the midline of the evaporator units and accumulates distillate received from the successive units (see FIG. 4).

Figure 5:
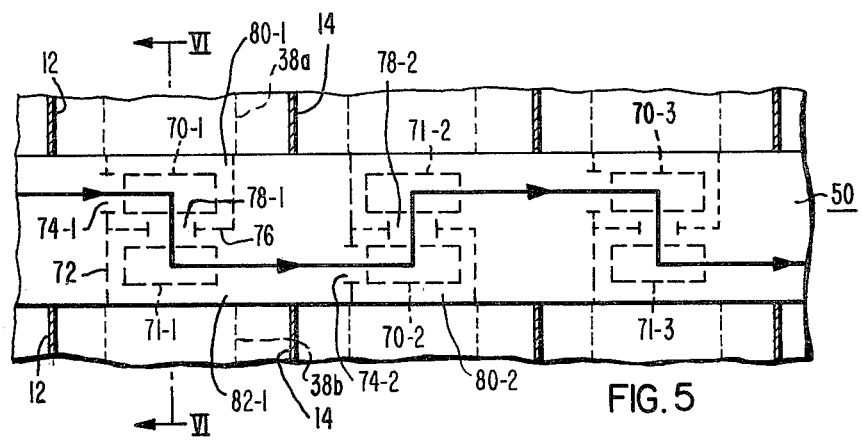
FIG. 5 shows a portion of a section taken along line V—V of FIG. 4 to illustrate, partially schematically, the manner in which the collection duct is partitioned and otherwise structured to provide for stage separation and distillate collection and cascading.

Distillate collected in the tray portions 38a and 38b respectively from tube portions in the condenser chambers 34 and 36 flows toward the transverse interstage partition at the center of the evaporator unit 10. As shown in FIGS. 4 and 5, the collection duct 50 is supported by the shell sidewalls and the tray 38 and extends in the transverse direction beneath the tray 38.

Each tray portion 38a or 38b is provided with a suitable opening 70 or 71 through which distillate falls from the tray portion 38a or 38b into the collection duct 50. As shown in FIG. 5, the interior of the collection duct 50 is partitioned to provide stage separation while allowing collected distillate in each stage to be cascaded to the next succeeding stage.

Particularly, the duct 50 in this case has a generally rectangular cross section. The stages in each evaporator unit 10 are stage-separated from those of each adjacent evaporator unit 10 by a partition 72 having an orifice 74 properly sized (in width and in height) to allow the accumulated distillate to cascade from the lower pressure stage of one unit 10 to the higher pressure stage of the next unit 10 while retaining stage separation.

Further, the duct 50 is provided with a partition 76 having an orifice 78 and otherwise structured to provide stage separation between the paired stages contained within each evaporator unit 10. Thus, the partition 76 in this case cooperates with the partition 72 to form a higher pressure duct chamber 80 into which distillate falls from the tray 38a in each evaporator unit.

Figure 6:
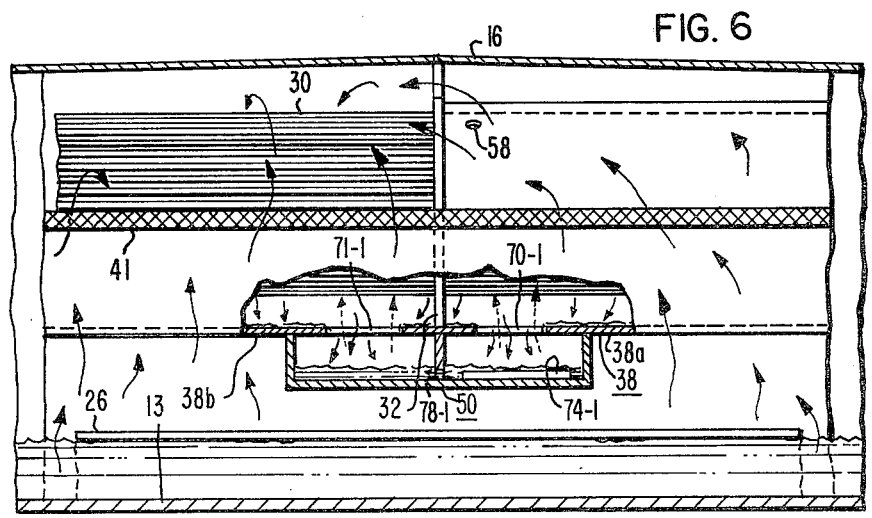
FIG. 6 shows a section taken along line VI—VI of FIG. 5.

In the chamber 80-1, distillate received through the orifice 74-1 from the next higher evaporator unit 10 accumulates with new distillate from the tray opening 70-1 and flows through the orifice 78-1 which, like other duct orifices is limited in height as seen in FIG. 6 to another chamber 82-1 in the lower pressure stage in the same unit 10 where flashoff occurs. Distillate falling through the opening 71-1 from the tray portion 38b of the lower pressure stage in the same unit 10 is added to the distillate accumulation in the chamber 82-1. The distillate then flows downstream through orifice 74-2 to chamber 80-2 beneath the tray potion 38a where flashoff occurs in the next stage, i.e. in the higher pressure stage of the next lower stage unit 10 in the plant train. Distillate continues to be collected and accumulated in the stage-to-stage manner described throughout the plant train.

As indicated by dotted arrows in FIG. 6, vapor which is flashed from distillate, entering the chamber 80-1 from the next higher stage, rises through the tray opening 70-1 to the condenser chamber 34. Similarly, flash-off vapor from the chamber 82-1 rises through the tray opening 71-1 for condensation in the chamber 36.

In the specific operation of the disclosed paired stage evaporator structure, improved user efficiency and overall performance and improved economy result from the described collection duct and related structure. Thus, increased cycle thermal efficiency is realized, since cascaded distillate is flashed off in every stage, thereby increasing the heat recovered in recycle condensers.

Further, the distillate formed is cascaded from stage to stage with the use of one centrally located collection duct as compared to two ducts that are required for the prior arrangement thereby reducing evaporator shell cost. In addition, maintenance is facilitated since access into the flash evaporation chamber can be obtained through a manway on either end of the evaporator unit 10.

What is claimed is:

1. A multistage flash evaporator unit for a multistage flash evaporation plant wherein successive evaporation stages are operated at successively decreasing pressures to evaporate a solvent from a solution, said evaporator unit comprising:

a generally elongated enclosure having opposed end walls and elongated side and top and bottom walls extending therebetween;

said enclosure having a lower portion where the solvent is evaporated and an upper portion wherein the distillate is condensed;

means for dividing said upper enclosure portion into a pair of separate condenser chambers staged in the longitudinal direction;

condenser means including an array of elongated heat exchanger tubes extending between said end walls to provide tube coolant flow in the longitudinal direction; said tubes extending through apertures in said dividing means;

means for partitioning said enclosure lower portion to define a pair of longitudinally extending separate evaporation chambers through which the solution flows successively in the cross-enclosure direction;

means for separating said condenser chambers from said evaporation chambers and for directing flow of evaporated solvent from one of said evaporation chambers to one of said condenser chambers in a higher pressure evaporation stage and from the other evaporation chamber to the other condenser chamber in the next lower pressure evaporation stage;

tray means associated with each condenser chamber to collect distillate and direct it toward said dividing means;

duct means extending in the transverse direction and supported generally beneath said dividing means and coupled to said tray means to receive distillate therefrom and to permit flashed vapor through said tray means into the associated condenser chamber; and means for partitioning said duct means into higher pressure and lower pressure chambers associated respectively with said condenser chambers and for directing distillate from the higher pressure duct chamber to the lower pressure duct chamber.

2. A multistage flash evaporator unit as set forth in claim 1 wherein said partitioning means has an orifice to direct distillate from a next higher stage evaporator unit into said higher pressure duct chambers associated with the higher pressure condenser chamber; and said partitioning means has another orifice to direct distillate from said one duct chamber to the other lower pressure duct chamber and a third orifice for directing distillate from said other duct chamber into the next lower stage evaporator unit.

3. A multistage flash evaporator unit as set forth in claim 1 wherein each of said tray means comprises an elongated tray supported beneath said tubes and extending between said dividing means and the associated end wall to define the bottom of the associated condenser chambers, each of said tray means having an opening therein to direct distillate into said duct means below.

4. A multistage flash evaporator plant having a plurality of multistage flash evaporator units as set forth in claim 1 wherein said duct means in each evaporator unit is coupled to a like duct means in the adjacent upstream and downstream evaporator units to provide ducted accumulation of distillate from unit to unit.

5. A plant as set forth in claim 4 wherein said partioning means has an orifice to direct distillate from a next higher stage evaporator unit into said higher pressure duct chambers associated with the higher pressure condenser chamber; and said partitioning means has another orifice to direct distillate from said one duct chamber to the other lower pressure duct chamber and a third orifice for directing distillate from said other duct chamber into the next lower stage evaporator unit.

* * * * *